US010386220B2

(12) United States Patent
Benz

(10) Patent No.: US 10,386,220 B2
(45) Date of Patent: Aug. 20, 2019

(54) PROBE END DEVICE AND METHOD FOR MANUFACTURING A PROBE END DEVICE

(71) Applicant: VEGA GRIESHABER KG, Wolfach (DE)

(72) Inventor: Joachim Benz, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 301 days.

(21) Appl. No.: 15/299,126

(22) Filed: Oct. 20, 2016

(65) Prior Publication Data

US 2017/0115154 A1 Apr. 27, 2017

(30) Foreign Application Priority Data

Oct. 21, 2015 (DE) .................. 10 2015 220 578

(51) Int. Cl.
*H01Q 1/22* (2006.01)
*G01F 23/00* (2006.01)
*G01S 13/10* (2006.01)
*G01S 13/88* (2006.01)
*G01F 23/284* (2006.01)
*G01F 23/26* (2006.01)

(52) U.S. Cl.
CPC ........ *G01F 23/284* (2013.01); *G01F 23/0023* (2013.01); *G01S 13/10* (2013.01); *G01S 13/88* (2013.01); *G01F 23/0069* (2013.01); *G01F 23/268* (2013.01); *H01Q 1/225* (2013.01)

(58) Field of Classification Search
CPC .................. G01S 13/88; G01S 7/4056; G01S 2007/4078; G01S 13/10; G01S 7/292; G01S 7/4017; G01S 7/02; G01F 23/284; G01F 23/0061; G01F 23/266; G01F 23/0023; G01F 23/268; G01F 13/006; G01F 23/0069; H01Q 1/225
USPC ..................... 342/642, 644; 73/304 C, 304 R
See application file for complete search history.

(56) References Cited

U.S. PATENT DOCUMENTS

| | | | |
|---|---|---|---|
| 3,319,514 A | | 5/1967 | McAllister, Jr. et al. |
| 5,594,449 A | * | 1/1997 | Otto ...................... G01F 23/284 340/612 |
| 5,945,913 A | * | 8/1999 | Gallagher ............... G01F 23/68 116/110 |
| 5,984,715 A | | 11/1999 | Schmidt |
| 7,159,458 B2 | | 1/2007 | Reimelt et al. |

(Continued)

FOREIGN PATENT DOCUMENTS

| DE | 2 401 486 A1 | 7/1974 |
|---|---|---|
| DE | 91 03 122 U1 | 9/1991 |

(Continued)

*Primary Examiner* — Olumide Ajibade Akonai
(74) *Attorney, Agent, or Firm* — Oblon, McClelland, Maier & Neustadt, L.L.P.

(57) ABSTRACT

A probe end device for a cable probe including a measuring cable having a predeterminable cross section is disclosed. The probe end device includes a probe end body having a receiving opening for an end portion of the measuring cable, the receiving opening having a wall, which is set up to provide a progression of an end portion, which is inserted into the receiving opening, of the measuring cable, and the wall further being set up to space apart the end portion, which is inserted into the receiving opening, of the measuring cable from at least one boundary of the probe end body.

14 Claims, 7 Drawing Sheets

(56) References Cited

U.S. PATENT DOCUMENTS

| | | | |
|---|---|---|---|
| 7,592,946 B2* | 9/2009 | Klees | G01F 23/284 |
| | | | 324/600 |
| 2004/0025588 A1* | 2/2004 | Schroth | G01F 23/268 |
| | | | 73/304 C |
| 2007/0205907 A1 | 9/2007 | Schenk, Jr. | |
| 2012/0085180 A1* | 4/2012 | Carton | G01F 23/284 |
| | | | 73/862.59 |
| 2014/0157891 A1* | 6/2014 | Price | G01F 23/42 |
| | | | 73/305 |
| 2015/0168203 A1 | 6/2015 | Haas et al. | |
| 2017/0089747 A1* | 3/2017 | Pichot | G01F 23/284 |

FOREIGN PATENT DOCUMENTS

| | | |
|---|---|---|
| DE | 42 24 635 A1 | 1/1994 |
| DE | 100 32 775 A1 | 1/2002 |
| DE | 10 2004 020 896 A1 | 11/2005 |
| DE | 10 2005 015 548 A1 | 10/2006 |
| EP | 0 849 570 A1 | 6/1998 |
| EP | 2 884 245 A1 | 6/2015 |
| WO | WO 01/63219 A2 | 8/2001 |
| WO | WO 2004/042333 A1 | 5/2004 |

\* cited by examiner

PROBE END DEVICE AND METHOD FOR MANUFACTURING A PROBE END DEVICE

REFERENCE TO RELATED APPLICATIONS

This application claims the benefit of the filing date of German Patent Application No. 10 2015 220 578.9 filed on 21 Oct. 2015, the disclosure of which is hereby incorporated herein by reference.

TECHNICAL FIELD

The present invention relates to the technical field of measurement technology. In particular, the present invention relates to radar, transit time or reflection measurement technology. The present invention therefore discloses a probe end device for a cable probe, a cable probe for a measuring device, a field device and a method for manufacturing a probe end device.

BACKGROUND OF THE INVENTION

In sensors which operate by the "guided radar" or "guided microwave" measurement principle, measuring probes consisting of a measuring cable and a tautening weight or centring weight are often used. The measuring probes assist in measuring levels by evaluating reflections, transit times and/or echoes of guided microwaves or guided radar waves. For a measurement of this type, waves or signals are excited which propagate along a probe inside a container and which are reflected at prominent locations in the container, such as at transitions between different materials. These reflections can be identified as echoes in an echo diagram. By measuring the time intervals between the echoes obtained by this measurement, a conclusion can be reached as to the prominent locations, such as the level, within the container. In particular, it can be detected whether the container is empty, in other words whether it is merely filled with air, or whether there is a filling material or bulk material in the container. Generally, a level measurement is only carried out once the probe touches the filling material or medium or is immersed in the filling material or medium. As long as the probe is not in contact with the medium of which the level is to be determined, there is a dead zone.

A tautening weight is attached at one end of a cable probe. The tautening weight or centring weight serves to keep the measuring cable of the measuring probe in as stable a position as possible within a container, so as to ensure the most uniform possible immersion of the end of the measuring cable in the filling material.

A weight device for a probe may be derived for example from US 2015168203 A1.

DE 10 2005 015 548 B4 discloses a device for determining and/or monitoring the level of a medium in which the fact that the electromagnetic signals come into contact with a medium and are thus influenced by the medium is exploited so as to be able to make predictions about the medium possible.

SUMMARY OF THE INVENTION

There may be a need to make efficient measurement of levels possible.

Accordingly, a probe end device, a measuring cable for a measuring device, a field device and a method for manufacturing a probe end device are provided.

The subject matter of the invention may be seen from the features of the independent claims. Specific embodiments and developments of the invention are set out in the dependent claims.

One aspect of the present invention provides a probe end device for a cable probe which comprises a measuring cable. The probe end device may be provided independently of the measuring cable, and may be connected to the measuring cable during the manufacture of the cable probe in that it is set up to receive the measuring cable, and in particular a measuring cable end portion or an end portion of the measuring cable, so as to form the cable probe. The measuring cable has a predeterminable cross section. The probe end device comprises a probe end body having a receiving opening for an end portion of the measuring cable. The receiving opening comprises a wall which is set up to provide a progression of an end portion, which is inserted into the receiving opening, of the measuring cable. The wall is further set up to space apart the end portion, which is inserted into the receiving opening, of the measuring cable from at least one boundary or surface of the probe body.

Generally, the end portion of the measuring cable or the measuring cable end portion may also be referred to as the measuring cable end, even though the measuring cable end actually refers to the end of the measuring cable end portion, the outermost end of the measuring cable or the far end of the measuring cable.

In one example, the measuring probe may comprise a measuring cable having a predeterminable cross section. The probe end device may comprise a probe end body or probe body having a receiving opening for an end portion of the measuring cable or for a measuring cable end. The probe end body may further comprise a cavity, which is connected to the receiving opening. In other words, it may substantially only be possible to pass from an environment of the probe end body into the interior of the probe end body, and in particular into the cavity of the probe end body, through the receiving opening. The cavity in the probe end body may receive the end portion of the measuring cable, the measuring cable end portion or the measuring cable end when the measuring cable is inserted into the probe end body. The receiving opening may be adapted to the cross section of the measuring cable in such a way that the receiving opening can be closed off or sealed off by means of the measuring cable so that the cavity can be separated off from an environment when the measuring cable is inserted into the cavity. In other words, the receiving opening may be adapted to the cross section of the measuring cable in such a way that it is made possible to seal off the cavity from an external region by inserting the measuring cable into the receiving opening.

In another example, predeterminable measuring cables having standardised cross-sectional areas and cross-sectional shapes and having predeterminable cable lengths may exist. For each of these predeterminable measuring cables or measuring cable shapes, which may be specified by a measuring cable type, there may be a matching cable end device.

The cavity may be formed in the wall of the receiving opening, and have a length which is greater than the length corresponding to the vertical distance of the receiving opening from a boundary, which is arranged opposite, of the probe body. The boundary may be an outer face and/or an outer surface of the probe end body. The boundary is set up substantially to separate the cavity from the environment. In one example, the thickest point of the probe end body may be in the region of the receiving opening. Because of this separation effect or the insulation effect, the probe end body may insulate the inserted end portion of the measuring cable from an environment and in particular from a material present in the environment and/or an atmosphere. Thus, the probe end body may prevent direct contact between the inserted end portion of the measuring cable and an atmosphere or a filling material.

The predeterminable cross section may be of any desired shape, for example a circular shape having a round cross-sectional area. The cross section for which the receiving opening is provided may determine the cross-sectional area of the receiving opening.

After the measuring cable is inserted into the cavity, the cavity may be filled in full or in part with the measuring cable. To prevent a probe end body filled with air from floating, the cavity which is not filled with the measuring cable may be filled with a high-density filling material. This filling material may for example have a high mass so as to increase the weight of the probe end body. The cavity may have a volume which is greater than or equal to the volume of the inserted end portion of the measuring cable or of the inserted measuring cable end portion.

The length and the cross-sectional area of the measuring cable determine the required minimum volume of the cavity. Assuming that the cross-sectional area of the inserted measuring cable in the interior of the probe body remains constant or increases rather than tapering, the minimum volume of the cavity may be predetermined by the length to be inserted of the measuring cable end portion and the cross-sectional area of the measuring cable, the minimum volume at least being required for receiving the measuring cable end portion.

Since the length of the inserted measuring cable end portion is to be greater than the length corresponding to a thickness of the probe end body, the cavity may, for a measuring cable having a round cross section, have a volume which is greater than the volume of a cylinder having a base face corresponding to the cross section of the receiving opening and a length corresponding to the vertical distance of the receiving opening from a boundary, which is arranged opposite, of the probe body.

Another aspect of the present invention discloses a cable probe for a measuring device, the cable probe comprising a measuring cable which is formed to guide an electromagnetic wave, for example to guide a microwave or a radar wave. The measuring cable may have a predeterminable cross section. Further, the cable probe may comprise the probe end device according to the invention. The measuring cable is inserted into the receiving opening of the probe device at a first end of the measuring cable.

In this inserted state, in which the measuring cable is inserted into the receiving opening, the wall of the receiving opening may determine the progression of the measuring cable. In particular, the wall of the probe end body and in particular the wall of the receiving opening may be formed in such a way that it predetermines a progression of the measuring cable end portion. The wall may ensure that the progression of the measuring cable end portion becomes predeterminable and does not follow the natural progression thereof, which it would adopt for example under the effect of gravity. The wall may ensure that the measuring cable end portion is at a distance from a predeterminable outer face of the probe end body. Thus, the wall of the probe end body may be used as an insulator. For example, a measuring cable at a distance from the lower surface may be prevented from coming into contact with a metal surface of a container base arranged below the lower surface.

In one example, the cavity or interior of the probe end body may be sealed off by means of the inserted measuring cable. The cavity may further be filled with the measuring cable end portion in full or in part in the inserted state. In one example, the receiving opening of the probe end body may be adapted to the cross section of the measuring cable in such a way that a press fit is produced when the measuring cable is inserted into the receiving opening. A press fit of this type may for example be produced in that the cross section of the receiving opening is smaller than the cross section of the measuring cable. The press fit may be produced by temporary heating prior to inserting the measuring cable into the receiving opening of the probe end device, and may ensure that the measuring cable end is held in the interior of the probe end device by the receiving opening and/or by the cavity wall by way of frictional forces.

A further aspect of the present invention discloses a field device or measuring device, such as a level measuring instrument, material measuring instrument or limit measuring instrument. The field device comprises an electronic means and the cable probe according to the invention. The electronic means is connected to the measuring cable and is configured to transmit and/or receive an electromagnetic wave. In one example, the electronic means may also comprise an evaluation means, for example to generate and evaluate a measurement curve or echo curve from the transmitted and/or received signals. To evaluate the echo curve, the electronic means, in particular the evaluation means, may use digital signal processing methods and for example calculate a level from a measured transit time and display it.

A further aspect of the present invention provides a method for manufacturing a probe device. The method comprises providing a probe end body and creating a receiving opening for inserting an end portion of a measuring cable into the probe end body. The method further comprises shaping a wall of the receiving opening and/or the probe end body in such a way that the wall can predetermine a progression of the measuring cable end portion which is inserted into the receiving opening. The wall is also shaped in such a way that it spaces the measuring cable end portion which is inserted into the receiving opening apart from at least one boundary, one surface and/or one outer surface of the probe end body.

In one example, the method comprises creating a cavity in the probe end body, the cavity being connected to the receiving opening. In addition, the method comprises adapting the receiving opening to the cross section of the measuring cable in such a way that the receiving opening can be closed off or sealed off by means of the measuring cable and that the cavity can be separated off from an environment when the measuring cable is inserted into the cavity.

Further, the method may for example comprise forming a length of the cavity which is greater than the length corresponding to the vertical distance of the receiving opening from a boundary, which is arranged opposite, of the probe body. The boundary, and in particular the wall between the boundary and the cavity, is set up substantially to separate off the cavity from the environment and/or from a filling material present in the environment. The boundary may be an outer face or outer surface of the probe end body.

In one example, the method comprises forming a volume of the cavity in such a way that the volume is greater than the volume of a virtual cylinder or comparison cylinder having a base face corresponding to the cross section of the receiving opening and having a length corresponding to the vertical distance of the receiving opening from a boundary, which is arranged opposite, of the probe end body, the boundary being set up substantially to separate off the cavity from the environment.

Further, a computer-readable storage medium may be provided which comprises a program code which, when it is executed by a processor, implements the method for manufacturing a probe end device or probe device.

Further, a computer program product may be provided which contains a program code which, when it is executed by a processor, causes the processor to implement the method for manufacturing a probe device.

For example, the program code may consist of instructions for a CNC (computerised numerical control) machine or for a 3D printer.

In sensors which operate by the "guided radar" or "guided microwave" measuring principle, measuring probes or probe devices are frequently used which comprise a measuring probe and a tautening weight, centring weight or probe end device. The probe weight used for holding the cable taut in cable measuring probes or in a corresponding probe device can lead to interferences in measurements in the region of a probe end which is connected to the probe weight. Measurement interferences may occur in the region of a probe end which is opposite an end of a measuring cable, which end is connected to an electronic means. The interferences may be brought about by inhomogeneities at the transition from the measuring cable to the probe weight, which result for example from the attachment of the weight to the free probe end. For example, an abrupt thickening in the transition region from the cross section of the measuring cable to the cross section of the probe weight may have an interference effect, said thickening being provided so as to produce as high a weight as possible at the probe end, in particular if the probe weight is formed solidly from solid material. An inhomogeneous transition or a thickening or deformation can influence the HF (high-frequency) properties of a measuring probe in such a way that undesirable interfering echoes occur. However, interferences may also occur if the measuring cable comes into contact with an undesired further object, for example with a container wall.

An interfering echo may be an echo which is visible in a measured echo curve but which is not related to the desired measurement object, for example to the level or to the transition between different materials. By contrast, a useful echo is an echo which is produced by an inhomogeneity having properties or a position which is/are of interest. A useful echo is for example an echo which originates from a level or from a boundary surface between two or more materials.

The interfering echo becomes an interfering factor if it has an influence on the useful echo of interest. Interfering echoes which are positioned further away from the useful echo can be clearly distinguished from a useful echo.

A further form of echo is an echo which occurs at the end of the measuring cable and in particular at the furthest end or outermost end of the measuring cable, in other words at the substantially open end of the measuring cable portion. On the one hand, this end echo may be used to identify the end of the measuring cable in an echo curve, and can therefore qualify as a useful echo. On the other hand, however, it may have an effect on a useful echo brought about by the level, and thus interfere with the detection of the useful echo. Thus, the end echo may have a useful and an interfering effect.

In particular if the level is positioned in the region of the measuring cable end, and the measuring cable extends substantially vertically, this may result in the interfering effect of the end echo. It is specifically at low levels that the end echo and the level echo are positioned close together, potentially resulting in a dead zone in which the end echo has such a great influence on the level echo that level measurement is not possible. The dead zone may be of an approximate size of 90 mm, in such a way that if a measuring probe of this type is used, assuming the use of the entire container height as the measuring cable length, it is still only possible to determine a level above 90 mm from the container base. It may be desirable to provide a cable probe having as small a dead zone as possible.

A dead zone may refer to the minimum length of a measuring cable portion which is required so as to produce an end portion of a measuring cable that is long enough that the interfering echo occurring at the far end of the measuring cable does not influence a useful echo brought about by the level, plus a length extending from a container base to the far measuring cable end. In other words, a dead zone of 90 mm may mean that the end of a measuring probe has to be immersed in the filling material by at least 90 mm so as to generate a useful echo which can be distinguished from the interfering echo brought about by the probe end. This requirement should be met in particular if the filling material is a poorly reflective material.

For straight guiding of the measuring cable, the end echo occurs substantially at a distance from the electronic means or input means corresponding to the probe length, which is determined by the measuring cable length and/or the length of the probe end device or probe weight. By way of constructional variants and shapings of the probe weight, the interfering influences of the interfering echoes brought about by the interference points can be reduced, in such a way that a desired useful echo is clearly distinguishable from an interfering echo. So as to alter the construction of the probe weight, probe weights of different lengths, different diameters and different masses may be used. However, even by varying the shape of the probe weights, for poorly reflective filling materials it is only possible to achieve a dead zone of an approximate size of 90 mm.

It may therefore be considered an aspect of the invention to bring about a large distance between the immersion point, in other words the level, and the probe end in the case of a small immersion depth into a filling material, in particular at an immersion depth of less than 90 mm. In other words, it may be desired to distance the end of a measuring cable, and thus the interfering echo brought about by the far end of the measuring cable, as far as possible from a point at which a measuring cable is immersed in the filling material. However, in the context of this distancing, care may need to be taken that the measuring cable does not come into contact with a container wall. The probe end device according to the invention should therefore be constituted in such a way that the distance between the far measuring cable end and an immersion position in a filling material is artificially lengthened. In spite of the lengthening of the distance, the measuring cable end is kept away from or insulated from an interfering point, for example from a container wall. As a result of the artificial lengthening, the position, which is shown in the echo curve, of the interfering echo occurring at the far measuring cable end and the position of the useful echo brought about by the boundary surface of the level can be separated far enough that the two echoes substantially do not influence one another in the echo curve. For the separation, it is possible to exploit the physical effect whereby the guided electromagnetic wave propagates along the measuring cable substantially independently of the shape of the measuring cable, and the transit time required for this propagation is used as the basis for a position, shown in the echo curve, of an echo.

Lengthening the measuring cable without touching the container base and/or without touching a container wall can be achieved in that the measuring cable end portion is stored as far as possible inside a probe end device, in particular inside a tautening weight and/or inside a centring weight. The probe end body of the probe end device may be set up in such a way that it can predetermine the progression of the measuring cable end portion and/or insulates or separates the measuring cable end portion from an interference point.

In one example, the probe end body may be set up in such a way that the filling material can come into contact with the inserted measuring cable at least in part. In another example, the probe end body of the probe end device for receiving the measuring cable end portion may be set up in such a way that the progression of the measuring cable is predeterminable, and that the probe end body substantially separates off, spaces apart or insulates the measuring cable from the environment and in particular from the filling material and/or from a container base.

According to one aspect of the present invention, the wall forms a cavity inside the probe end body, the cavity being connected to the receiving opening. The receiving opening is adapted to the cross section of the measuring cable in such a way that the receiving opening can be closed off by the measuring cable, in such a way that the cavity can be separated off from an environment when the measuring cable is inserted into the cavity. The cavity has a length which is greater than the length of the vertical distance of the receiving opening from a boundary, which is arranged opposite the receiving opening, of the probe end body. The boundary is set up substantially to separate off the cavity from the environment. In one example, the boundary may be the surface of the probe end body.

Because the cavity can be closed off by means of the measuring cable, a filling material can be kept away from the measuring cable, meaning that the propagation of an electromagnetic wave guided by the measuring cable is substantially not influenced by the filling material.

According to another aspect of the present invention, the probe body, the wall and/or the cavity are set up in the probe body in such a way that a progression shape of the inserted measuring cable end portion can be predetermined by the probe body and/or by the cavity.

Since the measuring cable and in particular a measuring probe are intended to detect the entire length in the interior of a container insofar as possible, the length of the measuring cable may be selected in such a way that it substantially corresponds to the container height. As a result, a freely movable probe end may be positioned close to a container base. The measuring cable may be produced from wire mesh or another flexible. As a result, the measuring cable end portion would extend as long as possible if the end is left subjected to gravity.

However, as a result of the cavity and/or the wall in the probe end device, the progression of an otherwise loose end can be influenced in such a way that the end is kept away, spaced apart or insulated from the boundary of the probe end body and thus also from the container base. The influence of the progression prevents the measuring cable end from filling up the entire length of a container, as would be the case if the measuring cable end were subjected to gravity in an uncontrolled manner. The probe end device forms a platform which keeps away or insulates the measuring cable end portion from the container base and/or from a container wall and simultaneously contributes the weight thereof to tautening the rest of the measuring cable. Thus, a progression of the measuring cable end portion, which is oriented in parallel with a container base or else counter to gravity can also be produced. In this way, it may be possible to lengthen the end portion of a measuring cable in such a way that it does not strike the container base which is predetermined by the container height, but is nevertheless longer than the container height. The probe end device may make it possible for a measuring cable portion which is arranged outside the probe end device to be tensioned taut by the weight of the probe end device and/or the measuring cable end portion positioned therein, whilst the end portion of the measuring cable extending inside the probe end device is untensioned or slack.

According to another aspect of the present invention, the cavity has a length and the cross section of the receiving opening, the cross section of the cavity corresponding to the cross section of the receiving opening over the entire length of the cavity.

In this way, the cavity may substantially correspond to the progression of the measuring cable end portion, and can influence the shape of the measuring cable end portion, without producing an air-filled cavity which only produces a low weight for the probe end body. For example, the entire cavity may be formed as a press fit, in such a way that the cavity alone can form sufficiently good fixing for the measuring end portion that a fixing means is not required at the far end of the measuring cable.

Alternatively, more material of the probe body may also be removed than is required for accommodating the measuring cable end portion, and the measuring cable end portion is located loosely inside the cavity, in such a way that, although the measuring cable end portion is substantially only held in the interior of the probe body by the press fit formed by the receiving opening, the shape of the progression of the measuring cable end portion in the interior of the cavity is not predetermined.

According to another aspect of the present invention, the probe body has a predeterminable weight. Depending on the use of the probe body, in particular depending on the density of the filling material to be measured, a heavier or less heavy probe end device may be required. The weight of the probe end device may be influenced by the size of the cavity, but also by the size of the probe body and/or the density of the material of the probe body, in such a way that probe end devices having different weights can be provided for different measuring cables and different purposes.

According to yet another aspect of the present invention, the cavity is formed so as to be L-shaped, U-shaped, spiral-shaped and/or helical-shaped. These different shapes of the cavity make it possible to allow the measuring cable end portion to deviate from a vertical position, which might lead to the measuring cable end striking a container base, and to use a different spatial direction for lengthening the measuring cable end portion. For example, the measuring cable end portion may be able to be wound in a spiral shape in a plane extending in parallel with the container base as a result of a helical-shaped cavity, and thus fill the available region well. As a result, not only a stretch of the measuring cable extending in the direction of gravity may be used as a length for the propagation of the electromagnetic wave, but also a region of the measuring cable extending horizontally with respect to the direction of gravity and held in this position by the probe body.

According to another aspect of the present invention, the probe body is made of plastics material, for example PTFE (polytetrafluoroethylene), PP (polypropylene), PE (polyethylene), PEEK (polyetheretherketone), ceramic material and/or metal. The weight of the probe end device can be influenced by way of the material selection.

According to yet another aspect of the present invention, the cavity comprises a fixing means or a cable fixer for a far measuring cable end.

If the receiving opening and in particular the wall of the receiving opening is formed so as to be very thin, the pressing force of the receiving opening brought about by the sealing or pressing may not be sufficient to hold the probe end device in place on the measuring cable. So as to produce sufficient stability in a construction of this type, a fixing means for the measuring cable end may be provided in the cavity. This fixing means may comprise a clamp or for example a screw by means of which the measuring cable end can be fixed.

According to another aspect of the present invention, the probe body comprises a centring means and/or a spacing means, the centring means and/or the spacing means being set up to hold a measuring cable which is inserted into the probe body in a predeterminable position.

For example, a centring means may be formed as a disc having a defined diameter. In another example, a spacing means may be formed as a cup or cylinder, in the centre of which the measuring cable coaxially extends. The centring means and the spacing means may cooperate to hold the cable in the predeterminable position. Thus, the measuring cable may for example be fixed at a predeterminable distance from an edge region of the probe end device. This spacing may be helpful if the measuring cable is to be fixed in a standpipe, and the measuring cable is to be held in as central or coaxial a position as possible.

According to another aspect of the present invention, the probe end body and/or the spacing means is formed so as to be disc-shaped, barrel-shaped, star-shaped and/or spoke-wheel-shaped. In another example, the probe end body and/or the spacing means is formed as a plastics material web.

The various embodiments of the probe end body or the cable guide make it possible to influence the weight of the probe end body. Secondly, by way of a specially adapted shape, it may also be made possible to create gaps in the probe end body, which make it possible to surround the probe end body with the filling material in a simple manner without direct contact with the measuring cable end in the interior of the probe end body occurring. In this way, a disc-shaped or star-shaped probe body can ensure that the filling material can easily penetrate between the spokes and flow around the measuring cable end portion, without coming into direct contact with the measuring cable end portion. By contrast with a solid probe weight, a permeable probe end body can allow a level to penetrate into the probe weight and make it possible to measure the level close to the receiving opening, and thus keep a dead zone at the probe end small. If the probe weight or the probe end device is formed as a solid cone, a useful echo can be detected substantially only in the region above the cone, in which the measuring cable enters the cone. Only this region above the cone may come into contact with the filling material. Therefore, the height of the region insulated from the probe weight can influence the extent of the dead zone.

In another example, the probe end body may also be permeable to the filling material, in such a way that the filling material can also come into contact with the measuring cable at least in part.

According to yet another aspect of the present invention, the cable probe is set up for use in a container having a predeterminable container height. However, the measuring cable has a length which is greater than the predeterminable container height and/or a predeterminable probe length.

The probe end device may keep the length of the measuring cable end portion, which goes beyond the container height and/or probe length, away from the container base. As a result of this keeping away, an interfering echo brought about by the far end of the measuring cable is spaced further apart from an immersion point of the measuring cable into a filling material, and a measuring cable which is longer than the container height can be used.

According to another aspect of the present invention, the measuring cable comprises a second end, the second end comprising an input means for an electromagnetic wave. Whereas the first end is far away from the input means, and is thus referred to as the far end, the second end is near to the input means, and is referred to as the near end.

The input means may be formed as an HF plug, by means of which the measuring cable can be coupled to an electronic means, causing the electronic means to implant or input an electromagnetic wave into the measuring cable. The second end may be opposite the far end, which serves to reflect the measuring pulse.

According to yet another aspect of the present invention, the field device is formed as a two-conductor device.

A two-conductor device comprises a two-conductor connection or two-wire connection, the two-conductor connection comprising exactly two electrical lines. The two-conductor connection or two-wire line is designed for communication, in particular for outputting at least one measuring value, for example a level measurement value. Further, via the same line, the field device, in particular the electronic means of a field device, may be supplied with power. The field device thus comprises a two-wire line via which the measuring instrument can be supplied with the power required for measuring operation and via which measurement data can be transmitted to a remote control unit or evaluation means.

It should be noted that different aspects of the invention have been disclosed with reference to different subject matters. In particular, some aspects have been disclosed with reference to device claims, whereas others have been disclosed with reference to method claims. However, a person skilled in the art may derive from the above description and the following description that, unless disclosed otherwise, in addition to any combination of features belonging to one category of subject matters, any combination between features relating to different categories of subject matters is considered to be disclosed by this text. In particular, combinations between features of device claims and features of method claims may be disclosed.

BRIEF DESCRIPTION OF THE DRAWINGS

In the following, further example embodiments of the present invention are disclosed with reference to the drawings.

DETAILED DESCRIPTION OF EMBODIMENTS

Figure 1:
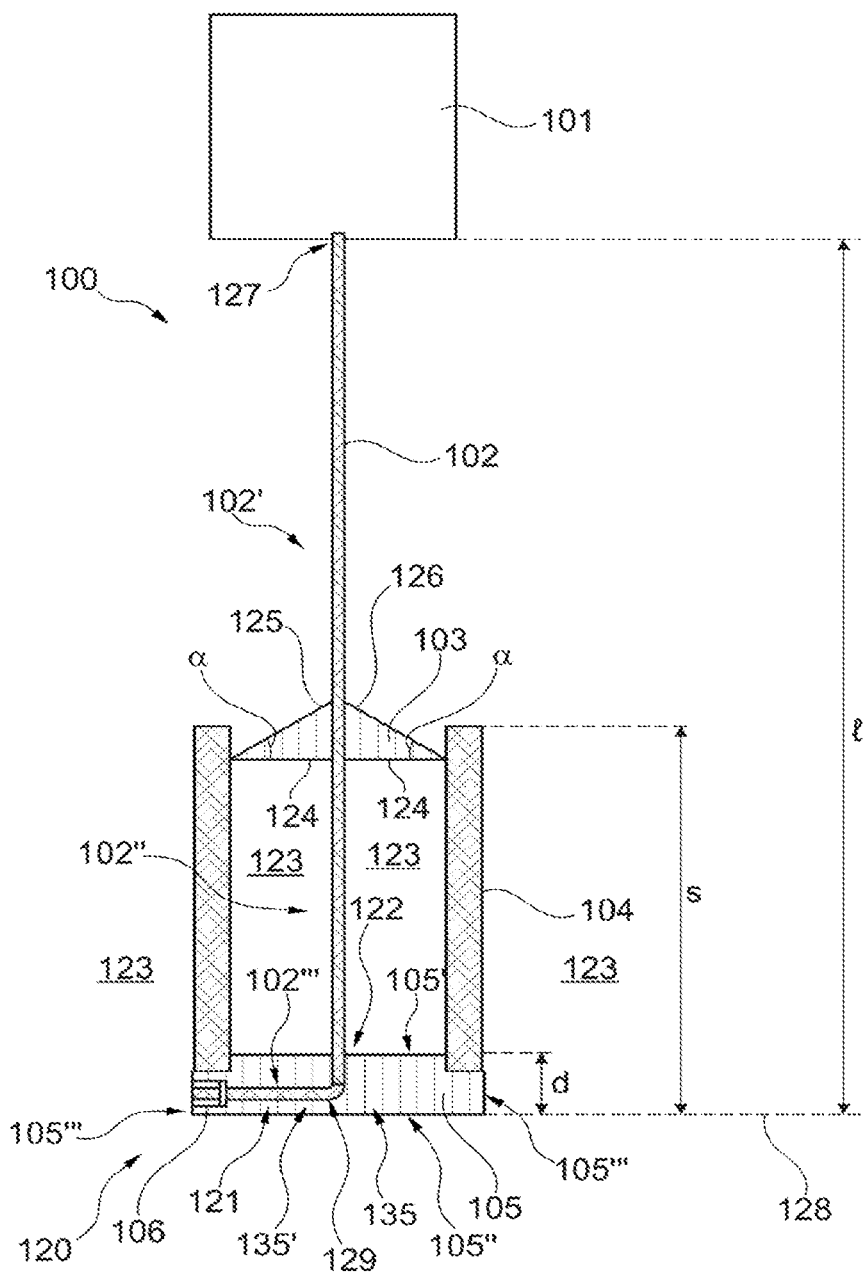
FIG. 1 is a sectional view of a disc-shaped probe end body in accordance with an example embodiment of the present invention.

The drawings are schematic and not to scale. In the following description of FIG. 1 to FIG. 11, like reference numerals are used for like or corresponding elements.

FIG. 1 is a sectional view of a cable probe comprising a disc-shaped probe end body 105 in accordance with an example embodiment of the present invention. The field device 100 substantially comprises the three components consisting of the electronic means 101, the measuring cable 102 and the probe end device 120. Since the probe end device 120 has a predeterminable mass, the probe end device 120 may also be referred to as a tautening weight 120, weight body 120 or centring weight 120. Together with the tautening weight 120, the measuring cable 102 forms a cable probe 102, 120. In FIG. 1, the tautening weight 120 is formed so as to be barrel-shaped. The tautening weight 120 could also merely comprise the probe end body 105 or the cable guide 105 so as to perform the function thereof of weighting and/or guiding the cable end. In addition to the cable guide 105, the tautening weight 120 from FIG. 1 comprises the cable centring element 103 or centring means 103 and the centring sleeve 104 or spacing means 104.

The cable guide 105 or the probe end body 105 consists of a different material from the spacing means 104, which is arranged vertically on the cable guide 105 as a cylinder.

The measuring cable 102 may substantially be subdivided into three portions, the measuring cable 102 itself being produced in a substantially single-piece or integral form, for example in the form of a wire cable. Thus, the three portions should merely be considered as designations, whereas the measuring cable 102 is free of physical interruptions along a longitudinal axis of the measuring cable 102. The portion between the electronic means 101 and the cable centring element 103 is designated as a first cable portion 102'. The second cable portion 102" extends substantially in a cavity which is formed by the cable centring element 103 and the centring sleeve 4 and the cable guide 105, and which belongs to the environment 123 of the cable guide 105 and can be filled at least in part with filling material. The third cable portion 102''' or the measuring cable end portion 102''' extends substantially completely in the interior of the cable guide 105. So as to be able to guide the cable end 102''' in the interior of the cable guide 105, a cavity 121, which extends from the receiving opening 122 on a first surface 105' of the cable guide 105 to the cable fixing element 106 or fixing means 106, is formed in the interior of the cable guide 105. The progression of the measuring cable is determined by the shape of the wall 135, 135'. If the measuring cable end portion 102''' is guided in a cavity 121, the wall 135, 135' supports substantially the entire progression of the measuring cable portion 102'''. If a cable fixing element 106 is present in the probe end body 105, the third cable portion 102''' extends from the receiving opening 122 to the cable fixing element 106. The wall 135, 135' is attached directly to the receiving opening 122, and can therefore be considered a wall of the receiving opening 122.

In the example of FIG. 1, the measuring cable 102 is formed so as to be L-shaped. The third cable portion 102''' comprises a kink 129. By contrast with a pure, vertical progression, in which the line portion 102''' would extend substantially completely in parallel with the outer surface of the centring sleeve 104 as far as the second surface 105", the lower surface 105" or the boundary 105" of the probe body 105, as a result of the L-shaped formation, a long extent of the third cable portion 102''' can be achieved without this end portion 102''' touching a container base (not shown in FIG. 1). The L-shape of the measuring cable is achieved by kinking a region of the end portion 102'''. The kink 129 makes it possible for the measuring cable 102 to deviate from the direction of gravity, which in FIG. 1 extends in the direction of the lower boundary 105". This kink 129 can be achieved by a correspondingly shaped wall 135. As a result of the kinking out of the vertical extension, it can be provided that the distance from the receiving opening 122 to the cable fixing element 106 or to the far end of the measuring cable along the measuring cable 102 is greater than the distance d, which corresponds to a thickness of the cable guide 105 in the region of the receiving opening 122. For a purely vertical progression of the measuring cable, the thickness d would constitute the maximum length of the end portion 102''', in particular if the receiving opening 122 is arranged at the thickest region of the cable guide 105. In other words, the probe end body 105 comprises a receiving opening 122 for the end 102''' of the measuring cable 102, through which opening the cable end 102''' can be inserted into the cavity 121. As a result of the insertion, the cavity is substantially sealed off from an environment 123, in such a way that no material or no matter can penetrate from the environment 123 into the interior 121 of the cable guide 105. In FIG. 1, there is no material in the environment 123. However, this environment 123 may comprise a filling material if the measuring instrument 100 is incorporated into a filling material container. As a result of a porous or permeable design of at least one means selected from the centring means 103, the spacing means 104 and the probe end body 105, filling material can also penetrate into the cavity shown in the interior of the spacing means 104 in FIG. 1, and thus arrive at the measuring cable 102 in the region of the second cable portion 102". The penetrating filling material can prevent the probe end device 120 from floating on the filling material.

As a result of the kink 129, a compressive force or supporting force acts on the end portion 102''', whilst a tensile force acts on the remaining portion of the measuring cable.

In spite of the filling material penetrating into the cavity, the filling material is still kept away from the third cable portion 102' as a result of the measuring cable 102 being incorporated into the receiving opening 122 in a precise fit. However, since the filling material can arrive at the measuring cable 102'' in the second cable portion 102'', a measurement can be taken not only in the outer region of the probe weight 120, in other words in the uppermost cable portion 102', but also in the interior of the probe weight 120, in other words in the region of the central cable portion 102''. A dead zone extends from a container base (not shown in FIG. 1) to the position at which the measuring cable 102 can first come into contact with the filling material. In addition to a distance of the probe end 105'' from a container base, the dead zone of the measuring device shown in FIG. 1 also comprises the portion d, in other words the thickness of the cable guide 105. However, this thickness d is less than the height s of the weight body 120. In addition, the height d can be made very small, since as a result of the kink in the measuring cable, a cable end 106 can be positioned far away from the second cable portion 102'', so as to reduce an interfering influence of the cable end. Since the probe base 105'' or the lower boundary 105'' is further designed in such a way that it comes to be positioned very close to the container base, the dead zone of the measuring probe is substantially determined by the thickness d of the cable guide 105.

The wall 135, 135' spaces the end portion 102''' of the measuring cable apart not only from the probe base 105'', but also from the lateral boundary 105'''. In the case of a cylindrical probe end body, the lateral boundary 105''' is the peripheral cylindrical surface of the probe end body 105. In general, the wall 135, 135' spaces the end portion 102''' of the measuring cable apart from the outer surface 105', 105'', 105''' of the probe end body 105.

The cable centring element 103 is made of plastics material, for example of PTFE, PP, PE, PEEK, ceramic material, and has a low-reflection shape. A low-reflection shape in this case means that there is a low value of an S-parameter providing a measure of the interfering echo brought about by the discontinuity formed by the cable centring element. A low-reflection shape, in other words a shape which only leads to slight reflections, may for example be a shape having a triangular cross section, as shown in FIG. 1. The triangular cross section of the rotationally symmetrical cone has an angle of inclination α between the sides 124 and 125, and between the sides 124 and 126. In cross section, this results in a triangular shape which forms a tip having an obtuse angle counter to the propagation direction of the emitted electromagnetic wave. In the direction of the wall of the spacing means 104, the cross section of the centring means 103 comprises acute angles α. The angle oriented in the direction of the spacing means 104 may for example be 30° or 45° or be in the range of from 30 degrees to 45 degrees. The cable centring element 103 is arranged in the interior of the centring sleeve 104 in part. The tips of the angles between the baseline 124 or base face 124 of the cable centring element 103 and the sides 125 and 126 respectively are positioned against the inner wall of the centring sleeve 104, which is formed as a hollow cylinder. During assembly, the cable centring element 103 can be displaced along the measuring cable 102 in the manner of a piston inside the centring sleeve 104. After the cable centring element 103 is placed in the desired position, which is as close as possible to the electronic means 101 at one end of the centring sleeve 104, the cable centring element 103 is fixed to the measuring cable 102 so as to maintain a predeterminable position of the measuring cable.

The interior of the centring sleeve 104 may be assigned to the environment of the cable guide 105. This interior forms a cavity. Even though the interior of the centring sleeve 104 is empty and shown as a cavity in FIG. 1, the probe weight 120, which comprises the centring sleeve 104, the cable guide 105 and the cable centring element 103, may also be formed as a solid body. The cable centring element 103 holds the measuring cable 102 in the centre of the probe device 120, and thus makes contact between the measuring cable 102 and the centring sleeve 104 more difficult. As a result of this orientation, it can be made easier to incorporate the probe end device 120 into a standpipe. Contact between the measuring cable 102 and the standpipe can be prevented.

The probe end device 120 is arranged rotationally symmetrically or coaxially around the measuring cable 102. A disequilibrium brought about by the kinked cable end portion 102''' is compensated. The measuring cable 102, and in particular a longitudinal axis of the measuring cable, forms an axis of symmetry for the centring sleeve 104 and/or the cable centring element 103 and for the external shape of the cable guide 105. As a result of the rotationally symmetrical formation, a uniform weight distribution about a centre of gravity of the measuring cable 102 can be achieved. The probe end device 120 or probe device 120 substantially has a length s which is formed by the thickness d of the cable guide 105 and the length of the centring sleeve 104. If the roof-shaped cable centring element 103 overhangs, as shown in FIG. 1, the total length of the probe end device 120 may end up slightly longer than the length s, this length having substantially no influence on the electrical properties of the tautening weight 120 which are responsible for the reflection of an electromagnetic wave at a boundary surface in the region of the second measuring cable portion 102''.

The centring sleeve 104, which may consist of metal or plastics material, thus either the same material as the cable guide 105 or a different material, serves both to increase the mass of the probe weight 120 and to centre the measuring cable 102 if the cable probe 102, 120 is incorporated into a standpipe or into a bypass. In a different embodiment, the cable guide 105 and centring sleeve 104 may be made in a single piece from plastics material or metal.

The cable guide 105 and/or the centring sleeve 104 is/are interrupted in part so as to make it possible for filling material to arrive at the central measuring cable portion 102''. However, the cable guide 105 prevents contact between the measuring cable 102 and the centring sleeve 104 by insulating the measuring cable end 102''' from the filling material. In one example, filing material can also arrive at the measuring cable 102, but the measuring cable end 102''' is spaced apart from a reference surface, such as a boundary face 105', 105'', 105''' of the cable guide 105, by means of the cable guide 105.

The cable guide 105 provides the shape of a progression of the end portion 102''' of the measuring cable in the interior of the cable guide 105, and makes it possible for the progression of the cable to deviate from a direction, which is predetermined by gravity, of the effect on the measuring cable 102 in the direction of the longitudinal axis of the measuring cable 102. As a result of this deviation, the shape of which can be predetermined by the formation of the cavity 121 in the interior of the probe body 105, at least one kink 129 can be introduced into the measuring cable 102, and can provide that the total length of the measuring cable 102 can extend beyond the probe length l. The probe length l extends from the input means 127, by means of which the measuring cable 102 can be fixed to the electronic means 101, to the lower surface 105" of the probe body 105. The cable fixing element 106 is arranged on an outer or far end of the measuring cable 102 in the region of the third cable portion 102''', and can serve to secure the measuring cable in the interior of the probe body 105. In addition to a pressing force on the measuring cable 102 from the receiving opening 122 and/or from the hollow body 121, the cable fixing element 106 or fixing means 106 may serve to secure against the cable slipping out of the probe body 105.

The kink 129 is designed in such a way that it can be passed with as little reflection as possible by an electromagnetic wave. As a result of the kink 129, the volume of the cavity 121 is greater than the volume which would extend in the longitudinal direction along the measuring cable from the receiving opening 122 to the lower face 105" or to the boundary 105" of the probe end body 105 if the measuring cable 102 were inserted vertically in the direction of gravity or in the longitudinal direction over the entire thickness d of the probe end body. The boundary 105" or the lower face 105" of the probe end body forms a baseline 128 or reference line 128, from which the thickness of the probe body d, the length s of the probe weight 120 and the length l of the cable probe are measured. In one example, as a result of the kink 129, the total length of the measuring cable 102 is longer than the probe length l, meaning that an artificial lengthening of the probe length l can be achieved.

Figure 2:
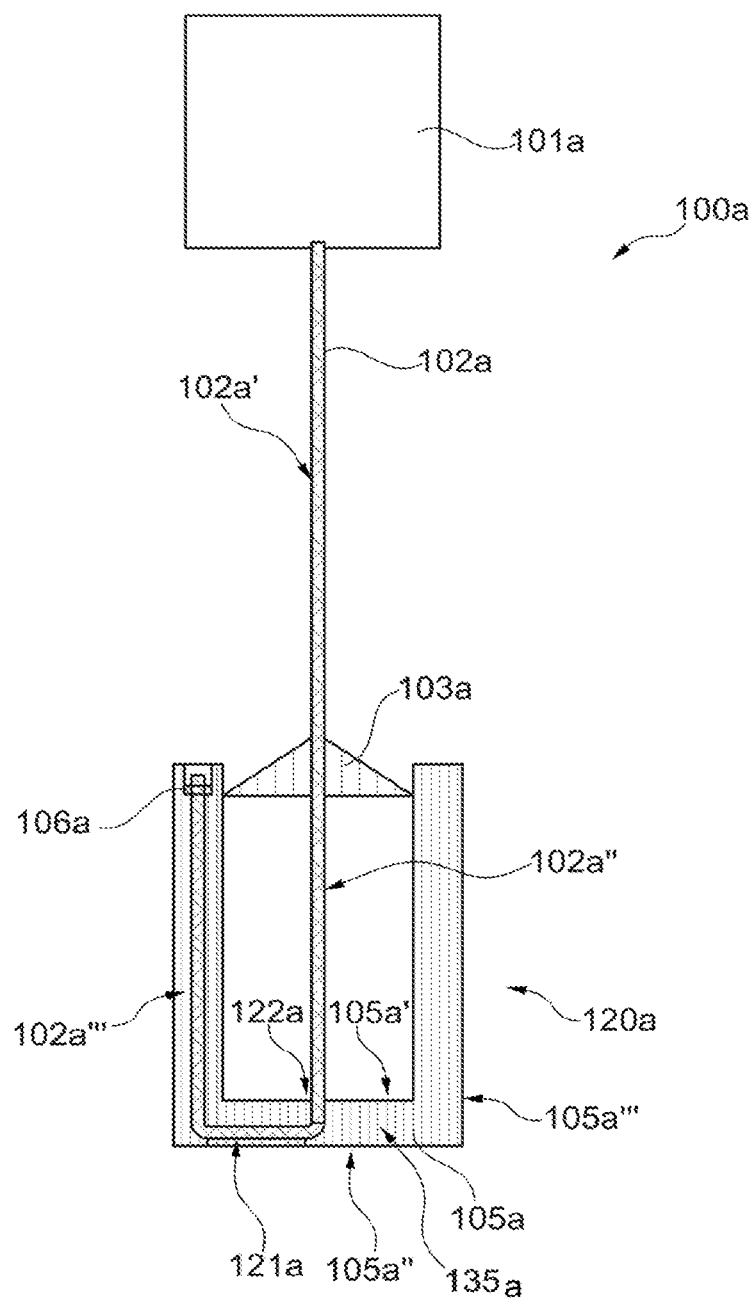
FIG. 2 is a sectional view of a U-shaped probe end body in accordance with an example embodiment of the present invention.

FIG. 2 is a sectional view of a U-shaped probe end body 105a or a barrel-shaped probe end body 105a. The construction of the field device 100a substantially corresponds to the construction of the field device 100 from FIG. 1. Whereas FIG. 1 shows a disc-shaped probe end body 105, FIG. 2 shows a barrel-shaped probe end body 105a which is formed with a U-shaped cross section. In other words, this means that the probe end body 105a does not comprise a centring sleeve 104 made of separate material or manufactured as a separate part, as shown in FIG. 1, but instead the centring sleeve is part of the probe end body 105a. Thus, the third cable portion 102a''' may also be formed so as to be U-shaped, and follow the wall of the probe end body 105a from the receiving opening 122a. The probe weight 120a or the probe end device 120a substantially comprises the probe end body 105a and the cable centring element 103a. The interior of the probe weight 120a is empty or hollow, in such a way that a filling material which protrudes beyond the surface 105a' can arrive at the second cable portion 102a" of the measuring cable 102a through openings in the barrel-shaped probe body 105a so as to produce a useful echo or level echo in this second cable portion. The first cable portion 102a' is positioned between the probe weight 102a, which comprises the cable centring element 103a, and the electronic means 101a. The cable centring element 103a is formed with a triangular cross section so as to provide low reflection, just as is shown in FIG. 1.

The fixing means 106a is formed in a side wall of the barrel-shaped probe body 105a. The third cable portion 102a''' is guided in the cavity 121a, which is formed so as to be U-shaped, resulting in the U shape of the end portion of the measuring cable 102a. Since the exterior of the probe body 105a or the probe end body 105a is formed so as to be rotationally symmetrical, for corresponding shaping of the cavity 121a in the interior of the probe end body 105a, the cable end 102a" could progress in yet other regions of the probe body 105a so as to increase the distance between the receiving opening 122a and the cable end in the region of the fixing means 106a. It should be noted that whereas the probe end body 105a is formed so as to be rotationally symmetrical externally, the cavity in the interior of the probe body 105a is not arranged rotationally symmetrically. The guide in the side wall results in a lengthening of the distance between the receiving opening 122a and the cable end 106a by comparison with an unkinked progression. This lengthening can increase the distinctiveness of an interfering echo brought about by the cable end from a useful echo brought about by a level in the region of the second cable portion 102a", without increasing the distance of a lower face 105a" of the probe body 105a from a base face (not shown in FIG. 2) of a container. Thus, a dead zone is substantially determined by the thickness d of the probe end body 105a, in other words by the distance between the upper surface 105a' and the lower surface 105a". The probe end body 105a is made completely of plastics material, in such a way that metal parts of a centring sleeve 104, as shown in FIG. 1, are not required. Since no metal parts are used in the wall of the probe body 105a, the external diameter of the tautening weight 120a, which is substantially determined by the cylinder faces, extending in parallel with the second cable portion 102a", of the probe body 105a, since the risk of contact between the measuring cable 102a, which guides the electromagnetic wave, and another metal part is reduced. Because of the lower external diameter, small tautening weights 120a can be implemented. The wall 135a may also provide that the measuring cable end 102a''' is spaced apart from the lateral outer surface 105a''', which extends in parallel with a longitudinal axis of the probe end device 120a.

Figure 3:
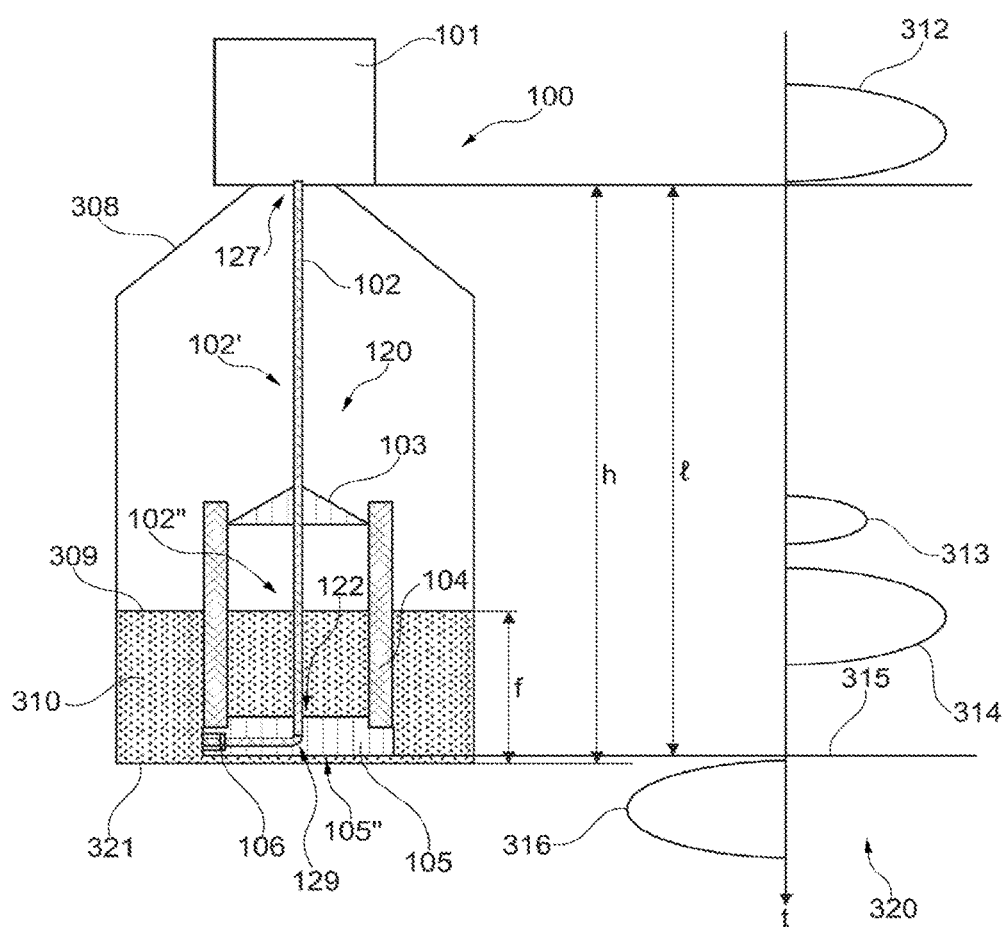
FIG. 3 is a sectional drawing of the probe end body from FIG. 1 in a container together with an echo curve in accordance with an example embodiment of the present invention.

FIG. 3 is a sectional view of the field device 100 from FIG. 1 in a container 308 together with an echo curve 320 in accordance with an example embodiment of the present invention. The probe weight 120 is arranged in the interior of the container 308 and is immersed in the filling material 310, which is located in the container 308 in the region of a base face 321 of the container 308. As a result of the immersion, and because the centring sleeve 104 and/or the probe end body 105 comprise openings, the filling material 310 arrives in the environment of the probe end body 105 and at the measuring cable 102 in the region of the second cable portion 102". A boundary layer 309 or filling height 309 forms between two different materials in the interior of the container 308. In FIG. 2, the two different materials are the filling material 310 and the atmosphere of air. The boundary layer 309 leads to a reflection of the electromagnetic wave which is migrating along the measuring cable 102 and which is propagating from the electronic means 101 in the direction of the container base 321. It can be seen from FIG. 1 that the container height h, which extends from the container base 321 into the region of a container opening and into the region of an input means 127, at which the electronic means 101 is connected to the measuring cable 102, is insignificantly larger than the probe length l, which extends from the input means 127 to the boundary face 105".

As well as the measuring instrument 100, an echo curve 320 is shown so as to clarify prominent points in the echo curve in relation to the physical causes thereof in the measuring arrangement. The time axis corresponds to a distance of the migrating electromagnetic wave along the measuring cable 102, in other words the time t can be converted into a physical distance and vice versa. The field device 100, measuring instrument 100, measuring device 100 or sensor 100 is incorporated into the container 308, in such a way that the measuring cable 102 and the measuring weight 120 are located in the interior of the container 308 and in such a way that the electronic means 101 is arranged in the exterior of the container 108. To fasten the electronic means 101 at the container opening, an incorporated flange (not shown in FIG. 3) may be used. The filling material 310 is generally not electrically conductive, resulting in strong reflections if an electromagnetic wave attempts to penetrate into the filling material 310. The sensor electronics 101 or electronic means 101 transmits an electromagnetic pulse 312 towards the filling material 310. Depending on the transit time and the pulse duration, this electromagnetic pulse has a particular pulse width which leads to a pulse shape along a time axis t. The pulse width may result in overlaps between echoes. The pulse width is also responsible for echoes brought about by this pulse having a certain pulse width. The amplitude of the reflections is dependent on the characteristics of an interference point, in particular on the reflection properties of the interference point.

The electromagnetic pulse 312 propagates towards the filling material 310, and after passing through the first sub-portion 102' strikes the low-reflection cable centring element 103. For the level of the filling material 310 shown in FIG. 3, which is located in the region of the second cable portion 102", in the interior of the probe weight 120, the first cable portion 102' is completely free of filling material, leading to propagation of the transmitted pulse to the cable centring element 103 substantially without interference. As a result of the optimised shape and material selection, in other words the low-reflection shape and the low-reflection material, the cable centring element 103 only causes a very slight interfering echo, as can be seen from the low amplitude of the echo 313. The influence of an echo can be seen from the ratio of the amplitude of the interfering echo 313 to the amplitude of the emitted pulse 312. The low amplitude of the interfering echo 313 is related to the amplitude of the transmission pulse 312. The amplitude is shown in the echo curve 320 perpendicularly to the time axis t by comparison with the emitted pulse 312.

After passing through the cable centring element 103, in the second cable region 102", the pulse propagating towards the filling material 310 arrives at the boundary layer 309 or filling material surface 309. Since the filling material 309 consists of substantially non-conductive material, the filling material for example being oil, a clearly detectable fill level echo 314 occurs in the region of the filling height f extending between the container base 321 and the filling material surface 309. As a result of the stronger reflection by comparison with reflections brought about by the cable centring element 103, the amplitude of the level echo 314 is much greater than the amplitude of the interfering echo 313 brought about by the cable centring element 103. Thus, the level echo 314 can be distinguished well from the slight interfering echo 313 brought about by the cable centring element 103, and the level can be determined with high precision.

A further interfering echo 316, which might influence the detectability of the level echo, in other words of the useful echo 314, is the end echo 316 brought about by the cable end in the region of the fixing means 106 of the measuring cable 102. This occurs at the far end of the measuring cable 102 in the direction of propagation of the electromagnetic wave, in other words where the measuring cable physically ends and transitions into a different material. This echo is detectable as a cable end echo 316, since the amplitude progresses in the opposite direction to the interfering echo 313 and the useful echo 314. The position is dependent on the distance between the receiving opening 122 and the cable end in the region of the fixing 106. If the cable end merely extended as far as the lower surface or boundary 105", the interfering echo 316 would be displaced along the time axis t towards the useful echo 314, and would lead to overlap between the interfering echo 316 and the useful echo 314 at a low fill height f. This overlap at a low level would lead to a dead zone in a particular range of the level f. The dead zone is a region in which unusable measurement results are produced and is determined by the distance between the measuring cable end and the level f.

In other words, after the pulse 312 has struck the boundary face 309, the pulse travels further through the electrically non-conductive filling material 310, for example oil, along the measuring cable 102 as far as the end of the measuring cable 102 in the region of the fixing means 106, and produces the end echo 316 as a further interfering echo 316. However, as a result of the kink 129, it has been possible to lengthen the cable end without it striking the container base 321 and without lengthening the container height h. As a result of the measuring cable 102 being lengthened by comparison with the probe length 315, l, the interfering echo 316 occurs in a region which is physically located a long way upstream from the probe length 315, l and/or the container height h. This physical distance can be mapped or projected onto the time axis of the echo curve 320. The lengthening results in the physical distances of the interfering echo 316 and useful echo 314 being separated, and the effect of the interfering echo 316 on the level echo 314 can be reduced or prevented. The level echo 314 can thus be detected with high measurement precision to determine the level 314. As a result, if the probe end device 120 according to the invention is used, even a level 309 f which is located close to the region of the base face 321 can be determined.

Figure 4:
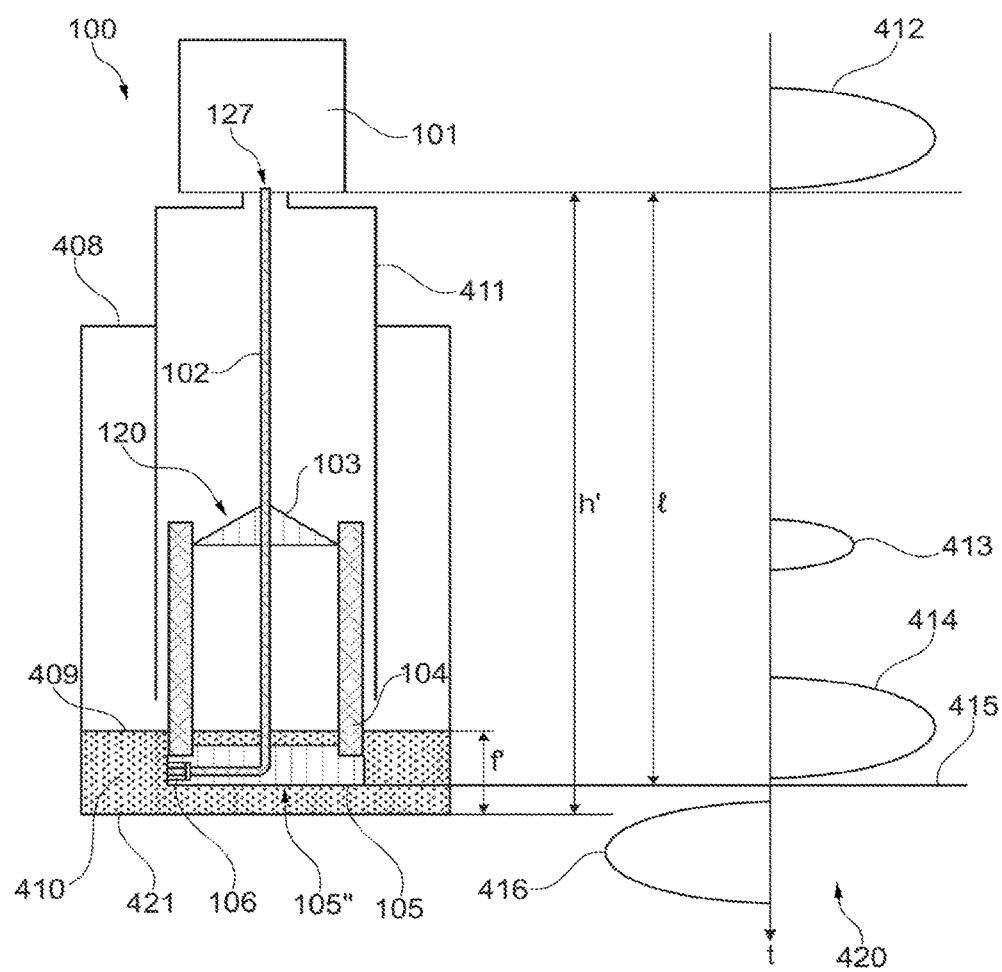
FIG. 4 is a cross-sectional view of a measurement construction comprising a field device from FIG. 1 and a standpipe in accordance with an example embodiment of the present invention.

FIG. 4 is a cross-sectional view of a measurement construction comprising a field device 100 from FIG. 1 and a standpipe 411 in accordance with an example embodiment of the present invention. According to FIG. 4, the measuring probe of the field device 100 is introduced into a container 408 comprising a standpipe 411. Since the same probe 102, 120 from FIG. 1 and FIG. 3 is used, the total length of the probe 1 also corresponds to the probe length l from FIG. 1 and FIG. 3. The container height h' results from the height of the container 408 and a portion of the length of the standpipe 411. The height h' is with respect to the container base 421. The fill height 409 of the filling material 410 is also with respect to the container base 421 and is denoted f'. The probe length l or the probe end 415 is determined from the lower surface 105" of the weight body 120, and extends as far as the input means 127 at which the electronic means 101 is connected to the measuring cable 102.

As well as the measurement arrangement, the associated curve 420 is shown. The electronic means 101 generates the electromagnetic pulse 412. The cable probe 102, 120 comprising the measuring cable 102 and the probe weight 120 is mounted inside the standpipe 411, in such a way that the centring sleeve 104 and the cylindrical wall of the standpipe 411 extend coaxially with the measuring cable 102. The centring sleeve 104, in combination with the cable centring element 103, provides that the measuring cable 102 is kept away or spaced apart from the wall of the standpipe 411 over the entire progression thereof in the interior of the standpipe 411. The standpipe 411 is open towards the base 421, in such a way that the probe weight 120 can exit the standpipe 411 towards the container base 421. The majority of the probe weight 120 is located in the standpipe 411.

The electrically non-conductive filling material 410 of which the level 409 is to be determined is filled into the container 408. The centring sleeve 104 ensures that the measuring cable 102 is arranged substantially centrally inside the standpipe 411, in other words along a longitudinal axis predetermined by the measuring cable 102. As a result of the centring and/or as a result of holding the measuring cable in a predeterminable position, the centring sleeve 104 prevents a short-circuit from being able to occur between the measuring cable 102 and the standpipe 411. In addition, in the standpipe 411, which is spaced apart from the container base 421, the centring sleeve 104 ensures that the filling material 410 can also still be measured in the gap between the standpipe end and the probe end 415.

During a measurement, the electromagnetic pulse 412 is transmitted along the measuring cable 102 towards the probe end 105", 415. This transmitted pulse 412 is shown in the echo curve 420. The cable centring element 103 produces a slight interfering echo 413. The transition between the different materials in the container interior and the filling material 410 at the boundary layer 409 provides the level echo 414. This level echo 414 is prominent close to the region of the probe end 105", 415.

If the measuring cable merely extended as far as the boundary 105", in other words as far as the physical probe end 415, the negative probe echo 416 would form in the region of the probe echo 415 and overlap with the useful echo 414. However, as a result of the artificial lengthening by way of the L-shaped kink in the measuring cable 102, the interfering echo 416 is successfully displaced into a region of the time axis t of the echo curve 420 corresponding to a more advanced time t than the probe end 415, meaning that there is no overlap or only a slight overlap between the useful echo 414 and the interfering echo 416. As a result of the kink, the useful echo 414 and the interfering echo 416 are spaced far apart.

Figure 5:
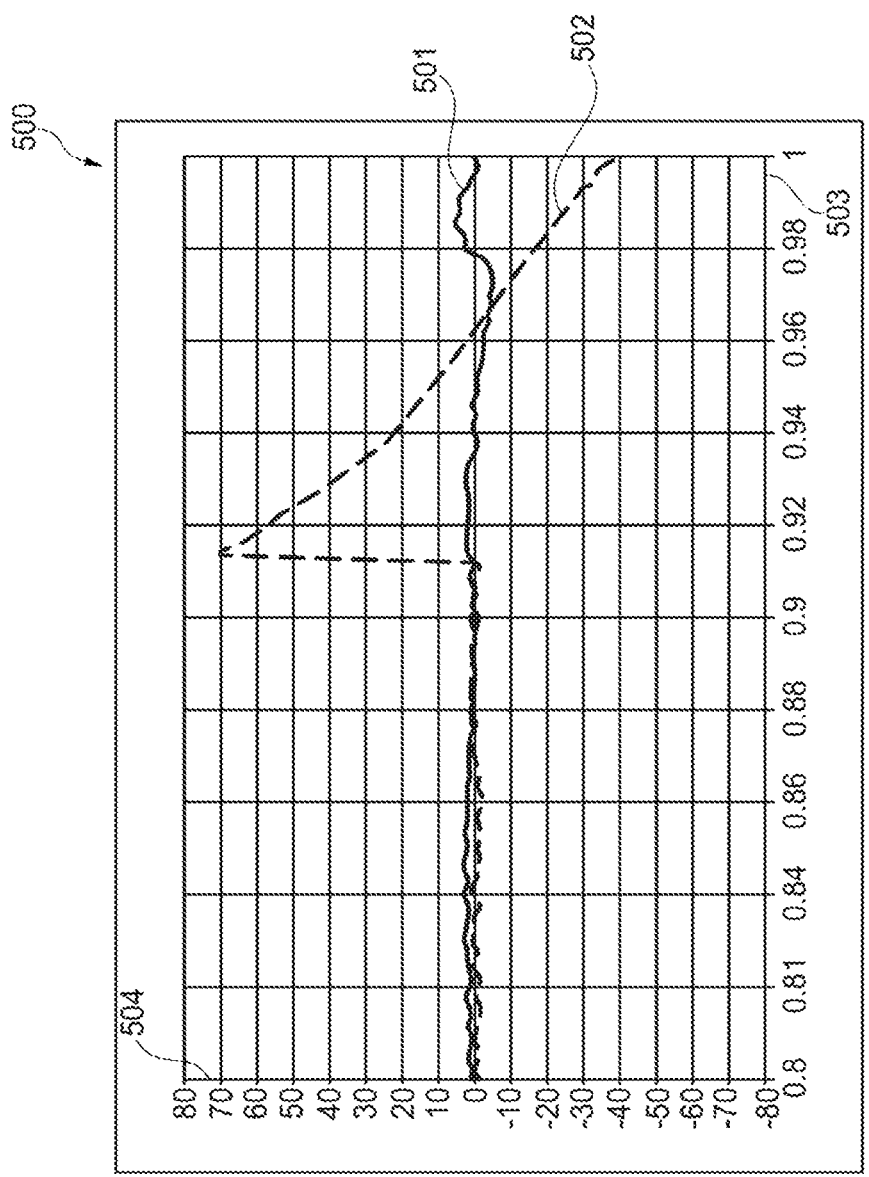
FIG. 5 shows a quality measurement curve for a cable probe in accordance with an example embodiment of the present invention.

FIG. 5 shows a quality measurement curve for a cable probe in accordance with an example embodiment of the present invention.

In the measurement graph 500, two measurement curves 501, 502 are provided. The measurement curves 501, 502 represent the deviation of an amplitude value of an echo curve from a target value in millimeters along a measured distance. The distance values in meters from 0.8 m to 1 m are shown on the x-axis 503. These distance values can be converted into time values t of the echo curve. The deviations from a target value in millimeters are shown on the y-axis 504. The graph 500 represents the measurement errors in a measurement in the filling material of oil, in particular in mineral oil, in other words in a container filled with oil, and compares the deviation from a target value with that of measurement probes having a solid tautening weight. The probe length of the two probes of which the properties are compared is l=1 m.

The curve 501 is associated with a measurement recorded using the cable probe according to the invention from FIG. 1. The measurement curve 502 is associated with a cable probe having a solid probe weight and unlengthened measuring cable length.

The distance value shown on the x-axis 503 determines the distance of the boundary face 309, 409 from the input means 127.

The tautening weight 120 having the construction according to the invention serves to keep the measuring cable 102 taut without producing significant interfering echoes as a result of the tautening weight. This tautening weight 120 for a cable probe only produces slight interfering echoes in a region close to the container base or far away from the input means. As a result of the slight interfering echoes, it can be made possible to measure filling materials having a low DC value in the region of the probe weight without a blocking distance with high precision. Filling materials having a low DC value are filling materials consisting of a material having a low dielectric constant or permittivity. Oil, in particular mineral oil, is a material having poor electrical conduction which produces strong reflections.

Cable probes having tautening weights of a solid construction or having centring weights of a solid construction may have a blocking distance of more than 100 mm. This means that a measurement of the container level in the region of less than 100 mm is not possible using a cable probe of this type. In other words, this may mean that a filling height f, f' can only be determined starting from 100 mm using a cable probe having a solid probe weight and/or having an unlengthened measuring cable 102, since the end echo can only be distinguished from the level echo starting from a length of 100 mm between the level and the cable end 106. The probe end body 105, 105a, which can be used for lengthening a measuring cable end portion in an insulated manner, makes possible a blocking distance of less than 100 mm. In the case of the probe end device according to the invention, a distinction between the tautening weight and the centring weight is no longer necessary. As a result of the reduction in the blocking distance, the container volume can be made good use of by the probe in that the probe end 105", 105a" is brought close to the container base.

The measurement curve 502 corresponds to a measurement probe which has a probe length l of one meter (l=1000 mm), having a solid tautening weight, but without lengthening of the measuring cable. It can be seen that the x-axis 503 shows the distance of the measurement curve from an input 127. This may mean that a container base 321, 421 is arranged at the distance value 1 m at the right-hand edge of the graph 500. As a result, the fill level 309, 409 is considered to start from this reference line. At a distance value of 910 mm or 0.91 m, a filling height of approximately 90 mm is reached. Only from this distance value onwards does the curve 502 progress towards smaller distance values in a straight line with a small measurement error around 0 mm. In other words, in regions from 910 mm to 1000 mm, in other words at filling heights of 0 to 90 mm, error-free measurement is not possible using the measuring probe associated with the curve 502. By contrast, the measurement curve 501 recorded using the measurement probe according to the invention from FIG. 1 in the filling material of mineral oil progresses in a straight line, and thus substantially without error, as far as a distance value of approximately 990 mm. Therefore, good determination of a filling height may be possible starting from a filling height f, f' of 10 mm using the measuring probe associated with the curve 501.

Curve 502 from FIG. 5 shows the measurement error of a 1 m long cable probe incorporated into an oil tank. The standard centring weight has been compared with a probe weight constructed according to the invention from FIG. 1.

Figure 6:
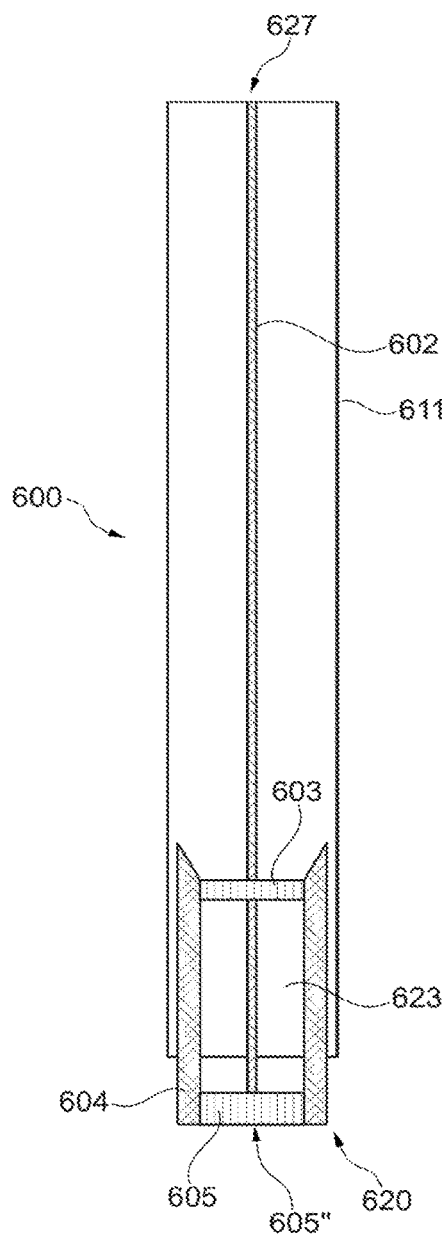
FIG. 6 is a cross-sectional view of a further probe arrangement in accordance with an example embodiment of the present invention.

FIG. 6 is a cross-sectional view of a further cable probe 600 in accordance with an example embodiment of the present invention. The electronic means which can be connected to the input means 627 is not shown in FIG. 6. FIG. 6 merely shows the measuring cable 602 and the probe weight 620. The probe weight 620 and the measuring cable 602 extend in part in the downwardly open standpipe 611. The probe weight 620 comprises the cable guide 605, the cable centring element 603 and the centring sleeve 604. The progression, which is lengthened in the interior of the cable guide 605, of the cable end portion of the measuring cable 602 cannot be seen in FIG. 6. Both the cable guide 605 and the cable centring element 603 are formed so as to be disc-shaped. The centring sleeve 604 is formed as a cylinder which is open on both sides, which is bounded by the disc-shaped cable centring element 604 and the disc-shaped cable guide 605. The cable guide 605 as well as the cable centring element 603 and the centring sleeve 604 comprise openings, in such a way that filling material can penetrate into the interior of the cable weight 620. As a result of the penetration of the filling material, a level above the cable guide 605 can be determined using the measuring cable 602.

Whereas the annular end, pointing away from the input means 627, of the centring sleeve 604 ends such that it is planar with the boundary 605" of the cable guide 605, the opening facing the input means 627 is formed so as to be funnel-shaped as far as the cable centring element 603. The cable centring element 603 is formed as a plastics material web for centring the measuring cable 602. The cable guide 605 is also formed as a plastics material web for centring and fixing the cable. The formation as a plastics material web provides that the lengthened end portion (not shown in FIG. 6) of the measuring cable 602 is insulated from the surrounding filling material or the surrounding environment by means of the cable guide 605, but the filling material can penetrate into the interior 623 of the tautening weight 620.

Figure 7:
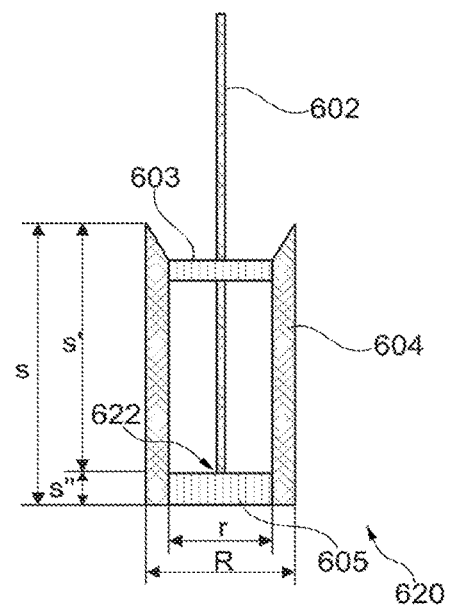
FIG. 7 is a detail of the tautening weight of the probe arrangement from FIG. 6 in accordance with an example embodiment of the present invention.

FIG. 7 is a detail of the tautening weight 620 from FIG. 6 in accordance with an example embodiment of the present invention. The measuring cable 602 is made of wire mesh, and has a circular diameter, which is substantially constant over the entire length, of 1.5 mm. Accordingly, the cable passage in the plastics material web 603 or in the cable centring element 603 is also formed with a corresponding diameter. Likewise, the receiving opening 622 has a circular diameter of 1.5 mm. The width r of the probe body 605 is 25 mm, and the total width R of the tautening weight 620, including the centring sleeve 604, is 35 mm. The total length s of the tautening weight 620 is 72 mm, and the thickness s", d of the probe body 605 is 8 mm. The length of the opening, facing the input means 627, of the centring sleeve 604 as far as the receiving opening 622 is thus s'=64 mm.

Figure 8:
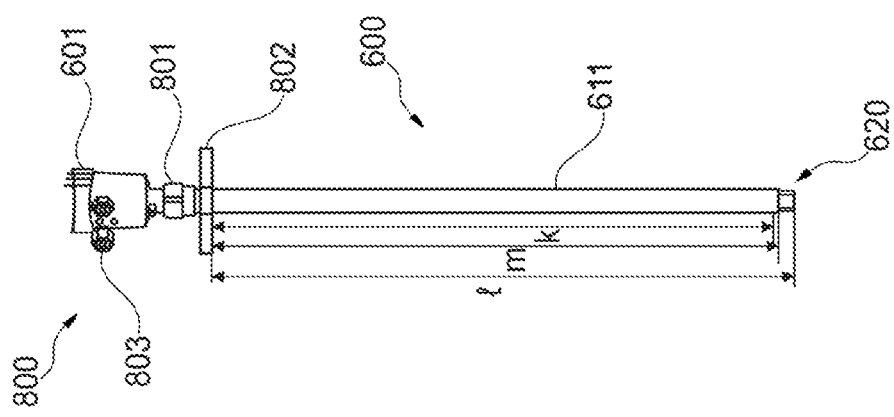
FIG. 8 is a side view of a measuring device comprising the probe arrangement from FIG. 6 in accordance with an example embodiment of the present invention.

FIG. 8 shows a field device 800 comprising the electronic means 601, the input means 801, a fixing flange 802, the standpipe 611 and the tautening weight 620, which exits the standpipe at an end of the standpipe 611 which is opposite the input means 801. The measuring cable 602 is covered by the standpipe 611 in FIG. 8. From the input means 801, which extends into the flange 802 as far as the lower surface of the flange 802, the total probe length of the cable probe 600 is l=1000 mm. The length m of the standpipe is 980 mm, in such a way that the tautening weight 620 protrudes 20 mm out of the standpipe 611. The total length as far as the upper edge (covered by the standpipe 611 in FIG. 8) of the tautening weight 620 is k=970 mm.

FIG. 8 also shows the electronic means 601 of a two-conductor device. The electronic means 601 comprises at least one electronic terminal 803 to which a two-wire line can be attached. This two-wire line can be used both for supplying power and for data transfer for the electronic means 601. In one example, a 4 . . . 20 mA signal is transmitted via the two-wire line; in another example, a HART signal is transmitted via the two-wire line.

Figure 9:
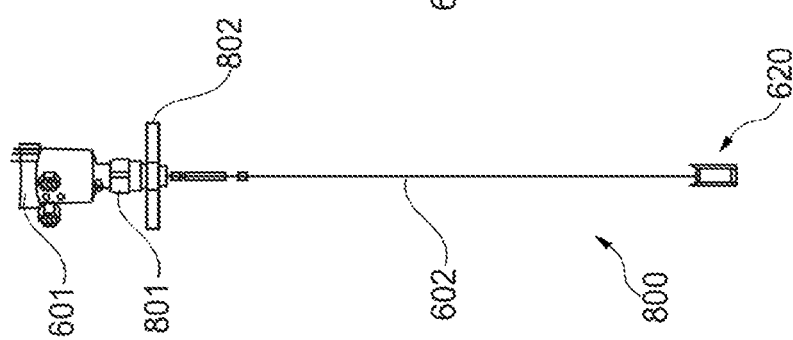
FIG. 9 is a side view of a measuring device comprising the probe arrangement shown in FIG. 6 without a standpipe in accordance with an example embodiment of the present invention.

FIG. 9 is a side view of the field device 800 from FIG. 8. The drawing shows the electronic means 601, the input means 801, the flange 802, the measuring cable 602 and the tautening weight 620. The measuring cable 620 is tautened by the gravity brought about by the probe weight 620. Since the standpipe 611 is omitted in FIG. 9, the measuring cable 602 can be seen between the electronic means 601 and the tautening weight 620.

Figure 10:
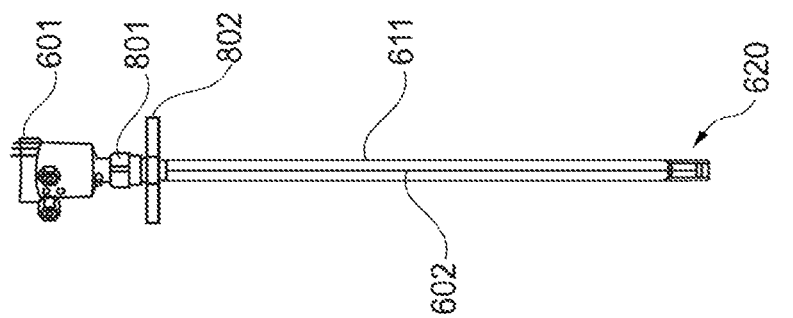
FIG. 10 is a cross section of the measuring device shown in FIG. 8 in accordance with an example embodiment of the present invention.

FIG. 10 is a sectional view of the field device 800 from FIG. 8, it likewise being possible to see the electronic means 601, the input means 801, the flange 802, the measuring cable 602, the standpipe 611 and the tautening weight 620.

Figure 11:
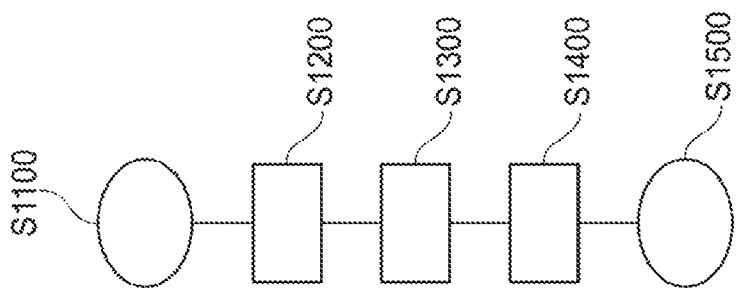
FIG. 11 is a flow chart for a method for manufacturing a probe device in accordance with an example embodiment of the present invention.

FIG. 11 is a flow chart for a method for manufacturing a probe device in accordance with an example embodiment of the present invention.

Starting from a start state S1100, in step S1200, a probe end body is provided. After the probe end body is provided, in step S1300, a receiving opening for inserting an end of a measuring cable into the probe body is created, and in step S1400, a wall 135, 135' of the receiving opening 122 and/or the probe end body 105 is shaped in such a way that it can predetermine a progression of the measuring cable end portion 102''' which is inserted into the receiving opening 122, or of a measuring cable end portion 102'''. The wall 135, 135' is shaped in such a way that it spaces apart the measuring cable end portion 102''' which is inserted into the receiving opening 122 from at least one boundary 105', 105", 105''', 105'''' of the probe end body 105.

The method ends at step S1500.

In another example, the wall may be shaped into a cavity 121 in the probe end body 105, which is connected to the receiving opening 122. Subsequently, the receiving opening 122 is adapted to the cross section of the measuring cable 102 in such a way that the receiving opening can be closed off by means of the measuring cable, in such a way that the cavity 121 can be separated off from an environment when the measuring cable is inserted into the cavity. In this inserted state, the measuring cable prevents a filling material from being able to penetrate into the interior of a probe body.

In the probe end body 105, a length of the cavity is formed in such a way that the length is greater than the length corresponding to the vertical distance d, s" of the receiving opening from a boundary, which is arranged opposite, of the probe end body, the boundary being set up substantially to separate off the cavity from the environment. Separating off the cavity substantially prevents filling material from being able to enter the cavity or reach a measuring cable which is inserted into the cavity. However, the probe body may be shaped in such a way that the probe body serves as insulation for the measuring cable, but the filling material can penetrate into the interior of a tautening weight.

This may mean that in the probe end body 105, a volume of the cavity is formed in such a way that the volume is greater than the volume of a comparable cylinder having a base face corresponding to the cross section of the receiving opening and a length corresponding to the vertical distance d, s" of the receiving opening from a boundary, which is arranged opposite, of the probe body.

For the sake of completeness, it should be noted that "comprising" and "having" do not exclude the possibility of other elements or steps and "a" or "an" does not exclude the possibility of a plurality. It should further be noted that features or steps which have been disclosed with reference to one of the above embodiments can also be used in combination with other features or steps of other above-disclosed embodiments. Reference numerals in the claims should not be treated as limiting.

The invention claimed is:

1. A cable probe for a measuring device, comprising:
a probe end device, the probe end device including:
a probe end body having a receiving opening for an end portion of a measuring cable, the end portion of the measuring cable being inserted into the receiving opening of the probe end device,
wherein the receiving opening comprises a wall which is configured to provide a progression of an end portion, which is inserted into the receiving opening, of the measuring cable,
wherein the wall is further set up to space apart the end portion, which is inserted into the receiving opening, of the measuring cable from at least one boundary of the probe end body,
wherein the wall forms a cavity inside the probe end body adjacent to the receiving opening, and
wherein the cavity has a length which is greater than the length of the vertical distance of the receiving opening from a boundary, which is arranged opposite the receiving opening, of the probe end body.

2. The cable probe according to claim 1, wherein the receiving opening is positioned to a cross section of the measuring cable in such a way that the receiving opening is closed off by the measuring cable, and in such a way that the cavity is separated off from an environment when the measuring cable is inserted into the cavity, and
wherein the boundary is set up to separate off the cavity from the environment.

3. The cable probe according to claim 2, wherein the cavity has the cross section of the receiving opening and has a length; and
wherein the cross section of the cavity corresponds to the cross section of the receiving opening over the entire length.

4. The cable probe according to claim 2, wherein the cavity is formed to be L-shaped, U-shaped and/or helical-shaped.

5. The cable probe according to claim 1, wherein the probe end body, the wall and/or the cavity is/are set up to predetermine a progression shape of the inserted end portion of the measuring cable.

6. The cable probe according to claim 1, wherein the probe end body is made of plastics material and/or metal.

7. The cable probe according to claim 1, wherein the wall and/or the cavity comprises a fixing means for a measuring cable end.

8. The cable probe according to claim 1, wherein the probe end body comprises a centring means and/or a spacing means,
wherein the centring means and/or the spacing means are set up to hold a measuring cable, which is inserted into the probe end body, in a predeterminable position.

9. The cable probe according to claim 8, wherein the probe end body and/or spacing means are formed to be disc-shaped, barrel-shaped, star-shaped and/or spokewheel-shaped.

10. The cable probe according to claim 1, wherein the cable probe is set up for use in a container having a predeterminable container height, and
wherein the measuring cable has a length which is greater than the predeterminable container height and/or greater than a predeterminable probe length.

11. The cable probe according to claim 1, wherein the measuring cable comprises a second end, and
wherein the second end comprises an input means for an electromagnetic wave.

12. A field device, comprising:
an electronic device;
a cable probe including a probe end device, the probe end device including a probe end body having a receiving opening for an end portion of a measuring cable, the end portion of a measuring cable being inserted into the receiving opening of the probe end device, wherein the receiving opening comprises a wall which is configured to provide a progression of an end portion, which is inserted into the receiving opening, of the measuring cable, wherein the wall is further set up to space apart the end portion, which is inserted into the receiving opening, of the measuring cable from at least one boundary of the probe end body, wherein the wall forms a cavity inside the probe end body adjacent to the receiving opening, and wherein the cavity has a length which is greater than the length of the vertical distance of the receiving opening from a boundary, which is arranged opposite the receiving opening, of the probe end body,
wherein the electronic device is connected to the measuring cable, and
wherein the electronic device is configured to transmit and/or receive an electromagnetic wave.

13. The field device according to claim 12, wherein the field device is formed as a two-wire field device.

14. A method for manufacturing a cable probe with a probe end device, the probe end device including a probe end body having a receiving opening for an end portion of a measuring cable, the end portion of the measuring cable being inserted into the receiving opening of the probe end device, wherein the receiving opening comprises a wall which is configured to provide a progression of an end portion, which is inserted into the receiving opening, of the measuring cable, wherein the wall is further set up to space apart the end portion, which is inserted into the receiving opening, of the measuring cable from at least one boundary of the probe end body, wherein the wall forms a cavity inside the probe end body adjacent to the receiving opening, and wherein the cavity has a length which is greater than the length of the vertical distance of the receiving opening from a boundary, which is arranged opposite the receiving opening, of the probe end body, comprising:
providing a probe end body;
creating a receiving opening for inserting a measuring cable end into the probe end body;
shaping a wall of the receiving opening to predetermine a progression of the end portion, which is inserted into the receiving opening, of the measuring cable;
shaping the wall to space apart the end portion, which is inserted into the receiving opening, of the measuring cable from at least one boundary of the probe end body; and
inserting an end portion of the measuring cable into the receiving opening of the probe end device.

* * * * *